United States Patent [19]

Fleckenstein et al.

[11] Patent Number: 4,974,016

[45] Date of Patent: Nov. 27, 1990

[54] METHOD AND APPARATUS FOR CHECKING FILM-CUTTING POSITIONS

[75] Inventors: Allen E. Fleckenstein, Bellevue; Whitney C. Langworthy, Bremerton, both of Wash.

[73] Assignee: Ciba-Geigy Corporation, Ardsley, N.Y.

[21] Appl. No.: 451,449

[22] Filed: Dec. 15, 1989

[51] Int. Cl.[5] ........ G03B 29/00

[52] U.S. Cl. ........ 355/29

[58] Field of Search ........ 355/28, 29; 83/371; 250/215, 578

[56] References Cited

U.S. PATENT DOCUMENTS

| | | | |
|---|---|---|---|
| 3,722,340 | 3/1973 | Kobayashi | 355/29 X |
| 3,811,768 | 5/1974 | Zahn et al. | 355/29 |
| 4,140,390 | 2/1979 | Schultheis et al. | 355/29 |
| 4,176,944 | 12/1979 | Payrhammer | 355/29 X |
| 4,641,019 | 2/1987 | Inatsuki | 355/29 X |
| 4,653,900 | 3/1987 | Kito et al. | 355/29 |
| 4,724,463 | 2/1988 | Matsumoto | 355/29 |
| 4,777,515 | 10/1988 | Aikoh et al. | 355/29 X |

*Primary Examiner*—Richard A. Wintercorn
*Attorney, Agent, or Firm*—Christensen, O'Connor, Johnson & Kindness

[57] ABSTRACT

A method and apparatus for determining whether a predetermined cut position lies within an unexposed portion of a roll of film is provided. A first density sensor 20 senses film density of a roll of film (10) and produces film density data. The film density data is stored in a first data storage device (50). A second data storage device (52) reads and stores a film density data value indicative of the lowest value of the film density stored in the first data storage device (50) and outputs this as base density data. A second density sensor (22) senses the film density at a predetermined cut position and produces cut position density data. A counter (66) counts pulses produced by a film drive and, when a predetermined number of pulses has been counted, indicating the arrival of the film at the predetermined cut position, the counter (66) produces a control signal that causes a comparator (26) to compare the base density data to the cut position density data. The comparator (26) produces a cutter control signal that causes a film cutter to cut the film (10) at the predetermined cut position only when the value of the cut position density data indicates that the film density at the cut position is within a predetermined range of the base density. In a typical installation, the film is comprised of several rolls of film spliced together. The invention includes a first splice detector (54) that detects a splice at a first time and a second splice detector (56) that detects the splice at a second subsequent time to identify each roll of film. The base density information is then keyed to a particular roll of film.

25 Claims, 2 Drawing Sheets

METHOD AND APPARATUS FOR CHECKING FILM-CUTTING POSITIONS

FIELD OF THE INVENTION

This invention relates to cutting photographic film into strips for insertion into envelopes and, more particularly, to a method and apparatus for sensing film density so as to prevent cutting the film through an exposed frame.

BACKGROUND OF THE INVENTION

In amateur photography, most film processing is accomplished in large, automatic batch-processing labs to help hold down developing costs and reduce turnaround times. Individual rolls of undeveloped film are spliced together to form large rolls of film for batch processing. As the film is processed, a notcher locates the exposed frames and notches an edge of the film near each detected frame. Printing equipment uses the notches to position each frame before printing the frames on photographic paper. Prior to redelivery of the processed film to the customer, the film is cut into strips. A film cutter senses the notches as a means of positioning the film to the proper cut location. As the film advances through the cutter, the notches are counted. After a predetermined number of notches has been sensed, the film has been advanced an appropriate distance so that, ideally, the film cutter cuts the film in the unexposed area between adjacent exposed frames.

One problem associated with automated batch-processing labs is that, if for any reason the notches are not located in proper relation to the exposed frames, the film cutter may cut the film in the wrong location. There are numerous reasons why the notcher might place a notch in a wrong location, including, for example, operator error in setting up and adjusting the notcher or a component failure in the notcher that causes the notcher to be out of calibration. In any event, misplaced notches may cause the film cutter to cut the film through an exposed frame, thereby irretrievably damaging that frame. Obviously, the consequences of such an error are unpleasant and will most likely subject the processing lab to customer complaints and a loss of future business from that customer.

As can be readily appreciated from the foregoing discussion, there is a need in a film-processing operation for preventing a film cutter from cutting film in a predetermined cut location that erroneously lies in an exposed frame. This invention is directed to a method for achieving these results and an apparatus for carrying out the method.

SUMMARY OF THE INVENTION

In accordance with the present invention, a method for checking film-cutting positions is provided. The method includes the steps of sensing a base density of the film, sensing a film density at a predetermined cut position of the film, comparing the base density of the film and the film density at the predetermined cut position, and producing a cutter control signal that causes a film cutter to cut the film at the predetermined cut position only if the film density at the predetermined cut position is within a predetermined range of the base density of the film.

In accordance with further aspects of the present invention, the method further comprises the steps of continuously sensing the density of the film and producing film density data whose values are related to the density of the film sensed, selecting a data value indicative of the lowest film density and producing this data value as base density data for the film, producing cut position density data whose value is related to the film density at the predetermined cut position, and comparing the base density data and the film density data at the predetermined cut position.

In accordance with still further aspects of the present invention, the method includes keying the base density data to a particular roll of film. This step includes detecting a splice at a first time indicative of an end of the base density data for a first roll of film and detecting the splice at a second time, subsequent to the first time, indicative of a start of the base density data for a second roll of film.

In accordance with the present invention, an apparatus for carrying out the cut position verification method described above is provided. The apparatus includes a first density sensor that senses film density of the film at a plurality of locations and produces film density data related to the film densities sensed. A second density sensor senses film density at a predetermined cut position and produces cut position density data whose value is related to the film density at the predetermined cut position. A base density selector selects a data value indicative of the lowest film density and outputs this value as base density data whose value is related to the base density of the film. A comparator compares the base density data and the cut position density data and produces a cutter control signal that causes a film cutter to cut the film at the predetermined cut position only if the cut position density data shows that the density at the predetermined cut position is within a predetermined range of the base density.

In accordance with still further aspects of the invention, the base density selector includes first and second splice detectors. The first and second splice detectors are used to determine the beginning and end of successive film orders to that the base density data can be updated for each new film order.

As will be appreciated from the foregoing summary, the invention provides a method for checking film-cutting positions by comparing the film density at a predetermined cut position with the base density of the film and permitting a film cutter to cut the film only if the film density at the predetermined cut position is within a predetermined range of the base density of the film. Further, an apparatus is provided for carrying out this method.

BRIEF DESCRIPTION OF THE DRAWINGS

The foregoing and other features and advantages of this invention will become more readily appreciated as the same becomes further understood by reference to the following detailed description when taken in conjunction with the accompanying drawings wherein.

DESCRIPTION OF THE PREFERRED EMBODIMENT

Figure 1:
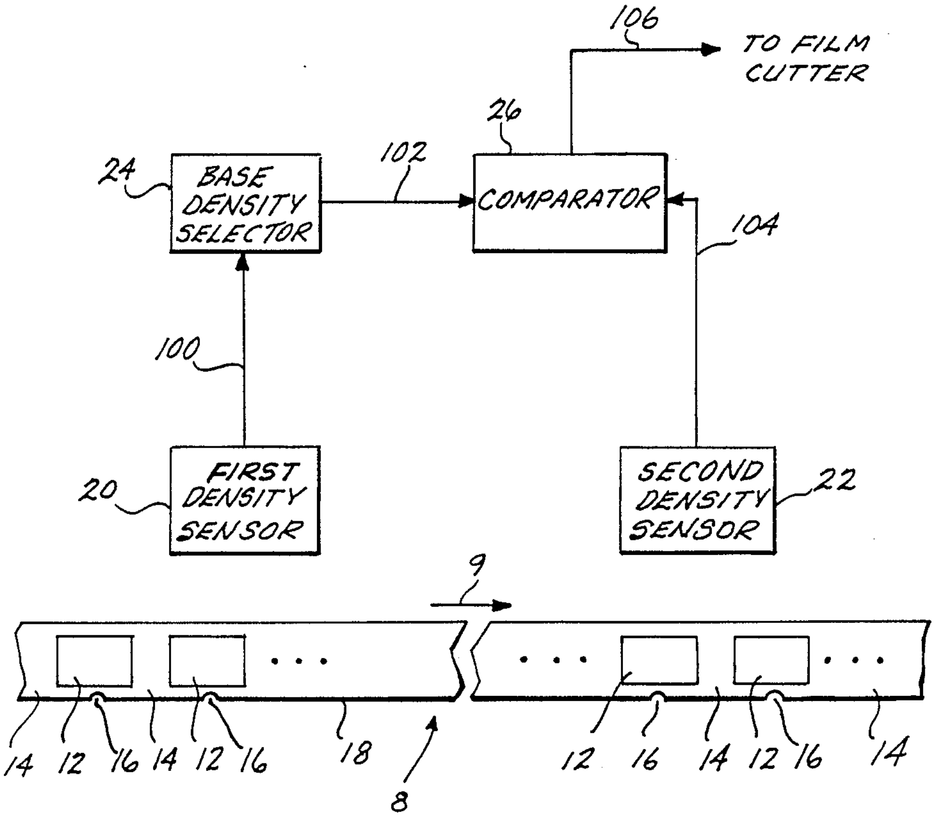
FIG. 1 is a block diagram depicting the broad, functional aspects of the present invention.

FIG. 1 illustrates the broad features of the present invention. In a batch operation, individual rolls of film are spliced together to form a continuous film web 8 that is advanced through the several stages of the processing operation. In FIG. 1, the film web 8 is illustrated as moving from left to right, as indicated by an arrow 9. The film web 8 contains exposed frames 12 located along its length, which are separated by unexposed spaces 14. The density (i.e., the optical density) of the film web 8 varies significantly between the unexposed spaces 14 and exposed frames 12. Typically, the density of the unexposed spaces 14 is substantially less than the density of the exposed frames 12 even though the density of different exposed frames 12 may, and typically does, vary significantly. The lowest density value of the film web 8 is hereinafter referred to as the base density of the film.

In a conventional manner, notches 16 are cut along an edge 18 of the web 8. The notches 16 are cut by a notcher, which is not shown and does not form part of the present invention. Different types of notchers, all of which are well known in the photographic film-processing art, place a notch 16 in a particular location adjacent each frame 12. The relative location of the notches 16 with respect to the adjacent frames 12 may vary between the different types of notchers, but the relative locations are the same for anyone type of notcher. For purposes of simplicity, the notches 16 shown in FIG. 1 are centered along each frame 12. It is to be understood, however, that the present invention works equally well with notches 16 placed in other locations relative to the exposed frames 12.

Once the notches 16 have been cut into the web 8, they, in part, control the processing operation. For example, a film cutter (also not shown in FIG. 1 and also not part of the present invention) cuts the web 8 into strips whose length is determined, in part, by a predetermined number of notches 16. That is, once the processing equipment senses the passage of a predetermined number of notches 16, the film cutter cuts the web 8. More specifically, once the predetermined number of notches 16 has been sensed, the film web 8 is advanced a fixed distance. This fixed distance positions the film so that the film cutter cuts the web 8 in a predetermined cut position. Ideally, the predetermined cut position lies in an unexposed space 14 between adjacent frames 12. The distance the film is advanced after the predetermined number of notches 16 has been sensed is dependent upon the type of notcher used in the processing operation. That is, if the notch 16 is located along the center of the frame 12, as shown in FIG. 1, the processing equipment is programmed to move the film a certain distance so as to position the next unexposed space 14 at the cutter. As can be readily appreciated by one of ordinary skill in the photographic film-processing art, when the notches 16 are placed in the wrong location, due to the notcher being out of calibration, for example, the film may very likely be advanced so that the predetermined cut position does not lie in an unexposed space 14 but, rather, in an exposed frame 12. As will become better understood from the following discussion, the method and apparatus of the present invention are designed to double check the predetermined cut position and prevent the cutter from cutting the film through an exposed frame 12.

As illustrated in FIG. 1, the apparatus of the present invention includes density sensors 20 and 22, a base density selector 24, and a comparator 26. The first density sensor 20 senses film density at a plurality of locations as the film web 8 passes the density sensor 20. Preferably, the first density sensor 20 continuously senses the film density. In the illustrated embodiment, density sensor 20 produces film density data on line 100 having values related to the sensed film densities. The base density selector receives the data on line 100, selects a data value indicative of the lowest film density, and outputs this value as base density data on line 102. In a manner that will be discussed more fully below, the second density sensor 22 senses film density at a predetermined cut position and produces cut position density data on line 104. Again, in the illustrated embodiment, the data on line 104 has a value related to the film density at the predetermined cut location. The comparator 24 compares the data on lines 102 and 104 and produces a cutter control signal on line 106. The cutter control signal, in part, controls a film cutter (not shown). If the data on lines 102 and 104 indicates that the density read by the second density sensor 22 is equal to, or within a predetermined range of, the base density determined by the base density selector 24, the cutter control signal will cause the cutter to cut the film web 8. If, however, the data on lines 102 and 104 indicate that the film density at the predetermined cut position is not within the predetermined range, e.g., where the film density at the predetermined cut position is substantially greater than the base density, the cutter control signal will prevent the cutter from cutting the film web 8, since the possibility exists that the cut position is in the area of a high-density exposed frame 12.

Figure 2:
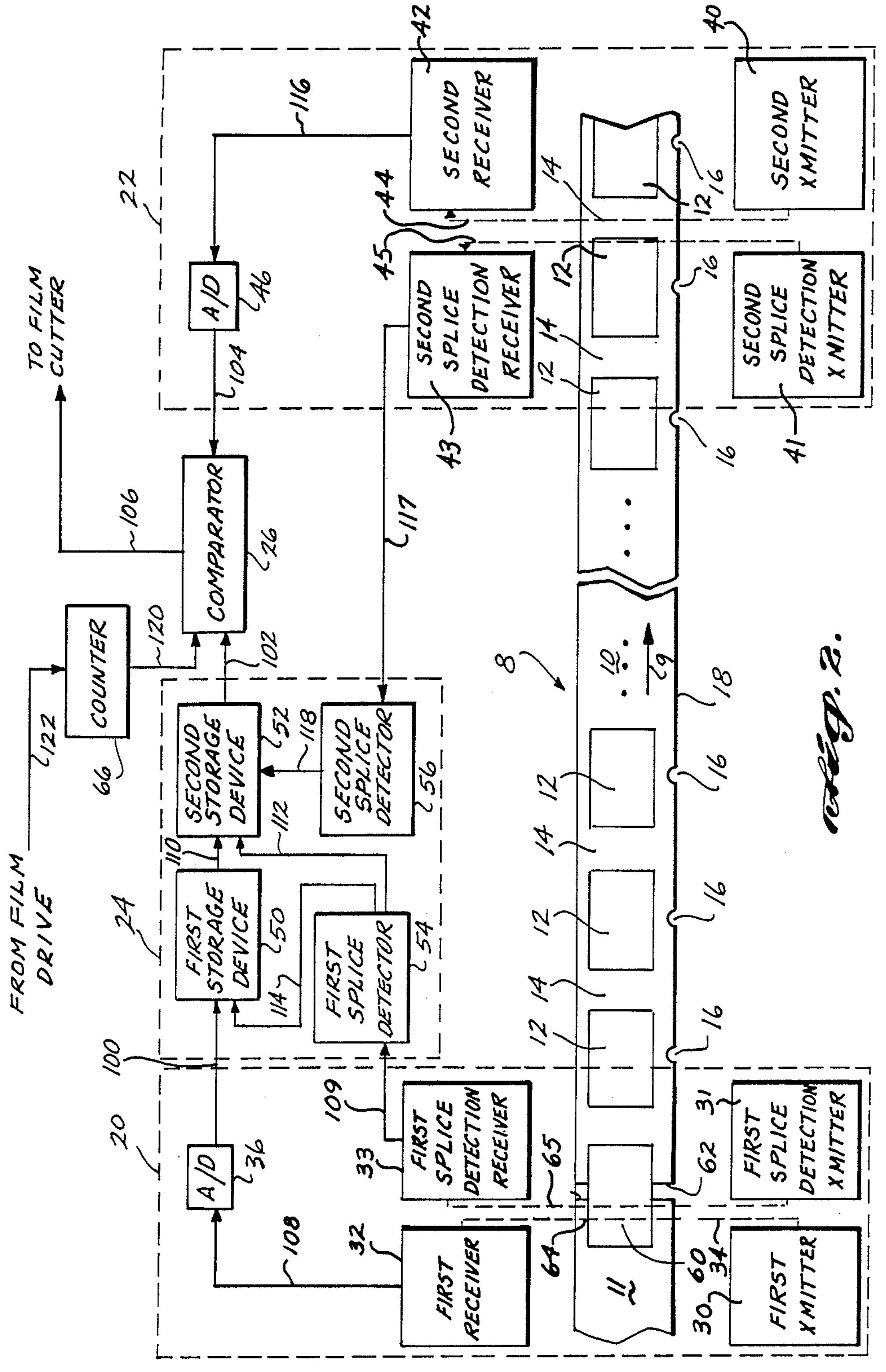
FIG. 2 is a block diagram of a preferred embodiment of the invention illustrated in FIG. 1.

FIG. 2 is a block diagram illustrating, in more detail, a preferred embodiment of the invention depicted in FIG. 1 and discussed above. As noted above, the density data values on lines 102 and 104 are related to the appropriate film densities. As will become better understood from the following discussion, the density data values in the preferred embodiment depicted in FIG. 2 are directly proportional to the film densities. However, it will be clear to those of ordinary skill in the art that the electronics could be engineered to use a different relationship between the density and the density data with equally successful results. For example, the density data could be inversely proportional to the film density.

The first density sensor 20 is an optical sensor and includes a first transmitter 30, a first receiver 32, and an analog-to-digital (A/D) converter 36. A beam of light, or light signal, 34 is transmitted by the first transmitter 30 and is directed toward the film web 8. The light signal 34, after passing through the film web 8, is detected by the first receiver 32. The strength of the received light signal 34 is a function of the density of the film web 8 through which it passes. More specifically, the strength of the light signal 34 that passes through higher density portions of the film web 8 is lower than the strength of the light signal 34 that passes through a lower density portion of the film web 8. Accordingly, less light will reach the first receiver 32 when the light signal 34 passes through an exposed frame 12 (i.e., a higher density portion of the film web 8) than when the light signal 34 passes through an unexposed portion of the film web 8, such as a space 14 (i.e., a lower density portion of the film web 8). As a result, the strength of the received light signal 34 is inversely proportional to the density of the film web 8 through which it passes. In response to the received light signal 34 the first receiver 32 produces an electric signal on line 108 hose magnitude is related to the density of the film portion through which the light signal 34 passes.

As noted above, the first sensor 20 preferably continuously senses the density of the film web 8 as it passes by the sensor 20. Further, the signal on line 108 is an analog signal. The A/D converter 36 converts the analog signal on line 108 to a digital signal and produces the film density data on line 100, as noted above.

The second sensor 22 is also an optical sensor and similarly includes a second transmitter 40, a second receiver 42, and an A/D converter 46. The second sensor 22 is preferably positioned near the film cutter (not shown) so that the second sensor 22 senses film density of the film web 8 at a predetermined cut position. A beam of light, or light signal, 44 is transmitted by the second transmitter 40 and is directed toward the film web 8. The light signal 44, after passing through the film web 8 at the predetermined cut position, is received by the second receiver 42. The strength of the received light signal 44 is inversely proportional to the density of the film web 8 sensed by the sensor 22. The receiver 42 produces a film density signal on line 116 and, more particularly, a cut position density signal corresponding to the density of the film at the predetermined cut position on the film web 8. In response to the received light signal 44 the magnitude of the cut position density signal is related to the strength of the received light signal 44 and to the density of the film. The A/D converter 46 converts the signal on line 116 from an analog signal to a digital signal and produces the cut position density data on line 104, as noted above.

In accordance with the preferred embodiment of the present invention, the light signals 34 and 44 consist of visible light energy. Other forms of light energy, such as infrared or ultraviolet energy, are typically not well suited for determining film density. For example, both the exposed and unexposed portions of the film web 8 appear transparent under infrared light and opaque under ultraviolet light. Further, the A/D converters 36 and 46 have been discussed above as forming a part of the respective density sensors 20 and 22. Such a grouping of components was done for the purpose of understanding and discussing the present invention. It is to be understood, however, that in an actual physical embodiment, the A/D converters 36 and 46 may be separate from the sensors 20 and 22. Further, in accordance with the preferred embodiment of the present invention illustrated in FIG. 2, the density data values produced on lines 100 and 104 are directly proportional to the corresponding film densities. However, it is to be understood that the method and apparatus of the present invention work equally well with other relationships between the film density and density data values.

The base density selector 24 includes data storage devices 50 and 52 and splice detectors 54 and 56. The splice detectors 54 and 56 will be discussed in more detail below. The first data storage device 50 receives and stores the film density data on line 100 and produces an output, in the form of film density data, on line 110. The first data storage device 50 also operates as a latching device that updates the output on line 110 each time a lower film density data value is received on line 100. That is, the first data storage device 50 selects the lowest value of the film density data on line 100 and outputs this value on line 110. The second data storage device 52 reads and stores the output from the first data storage device 50. As will be discussed more fully below, the data stored in the second data storage device 52 is updated at appropriate times and produced as the base density data on line 102, as noted above.

As is well known in the photographic film-processing art, individual rolls of film are spliced together to form the continuous film web 8 for batch processing. The continuous film web 8 aids in reducing both processing costs and processing times of the individual rolls. The individual rolls of film are typically spliced together at adjacent ends with splice tape. As can be seen in FIG. 2, a portion of the film web 8 includes a first roll of film 10 and a second roll of film 11 spliced together at their ends by a piece of splice tape 60. Specifically, a trailing edge 62 of the first roll of film 10 is spliced to a leading edge 64 of the second roll of film 11. Typically, the splice tape 60 is substantially opaque and, hence, optically much denser to light signals than either the exposed frames 12 or unexposed spaces 14. The significance of the splice tape's high density will become evident from the following discussion.

Because different rolls of film may very likely have different base densities, it is important to determine the base density for each particular roll of film. That is, the base density data values should be keyed to each respective roll of film. This is accomplished in the present invention, in part, by providing splice detectors 54 and 56, briefly noted above. The splice detectors 54 and 56 may be thought of as comparators that compare the magnitudes of the signals on their input lines to predetermined threshold values. Preferably, the only time the signal magnitudes on the input lines to the splice detectors 54 and 56 are less than the threshold values is when the splice tape 60, which, as noted above, is substantially opaque, is sensed by the sensors 20 and 22. Accordingly, the splice detectors 54 and 56 will switch states when the splice tape 60 is sensed. Thus, the splice tape 60 may be used to indicate the beginning and ending of a particular roll of film, such as the roll of film 10 illustrated in FIG. 2.

A first splice detection transmitter 31 is located in close proximity to the first transmitter 30. In fact, in most situations the first transmitter 30, first receiver 32, first splice detection transmitter 31, and a first splice detection receiver 33 will all be part of a signal optical sensor module. The first splice detection transmitter 31 produces a light signal 35 that passes through the film web 8 and is received by the first splice detection receiver 33. When the splice tape 60 passes between the first splice detection transmitter 31 and the first splice detection receiver 33 the light path is essentially blocked and the magnitude of the signal on line 109 to the first splice detector 54 drops below the threshold value. As a result, the splice detector 54 switches states and produces outputs on lines 112 and 114. The output on line 114 is a reset signal that causes the first data storage device 50 to reset, thus indicating an end of the density data for the roll of film 10. Concurrently, the output on line 112 is a stop signal that causes the second data storage device 52 to stop reading outputs on line 110, thus indicating that subsequent data values on line 110 are for the next roll of film 11.

As the film web 8 continues to advance (i.e., from left to right in FIG. 2), the splice tape 60 passes between a second splice detection transmitter 41 and its associated second splice detection receiver 43. The splice tape 60 blocks the passage of light beam 45, thereby decreasing the signal from second splice detection receiver 43 on line 117 to the second splice detector 56. When the magnitude of the density signal on line 117 drops below the threshold value, the splice detector 56 switches states and produces an output on line 118. The output on line 118 is a start signal that causes the second storage device 52 to resume reading data on line 110, i.e., the base density data for the next roll of film 11.

As noted above, the purpose of the present invention is to verify that a predetermined cut position lies in an unexposed portion of the film web 8 and to prevent the film cutter from cutting the film web 8 through an exposed frame 12. To accomplish this, the second sensor 22, as noted above, senses the film density at a predetermined cut position. As illustrated in FIG. 2, the comparator 26 is controlled by a control signal on line 120. The signal on line 120 is related to the advancement of the film web 8. The signal on line 120 may, for example, be produced by a counter 66 that counts pulses produced by a film drive, such as a stepper motor, which advances the film web 8. In a conventional manner, the stepper motor produces pulses on line 122. A predetermined number of pulses is produced between successive predetermined cut positions. Accordingly, these pulses can be counted, and when the predetermined number of pulses has been counted, the counter 66 produces the control signal on line 120. Thus, the control signal on line 120 causes the comparator to compare the current base density data value on line 102 with the cut position density data on line 104 and produce the cutter control signal on line 106, as noted above.

As also noted above, in the preferred embodiment of the invention, the density data values are directly proportional to the corresponding film densities. Accordingly, if the cut position density data on line 104 is greater than the base density data on line 102 (which indicates that the cut position density is greater than the base density), there is a possibility that the predetermined cut position lies in an exposed frame 12, in which case, the cutter control signal on line 106 will not permit the film cutter to cut the film 10.

As can be readily appreciated from the foregoing description, the invention provides a method and apparatus for checking cutting positions by sensing film density and permitting a film cutter to cut the film only when a predetermined cut position lies in an unexposed portion of the film. While a preferred embodiment of the invention has been illustrated and described herein, it is to be understood that, within the scope of the appended claims, various changes can be made. Since the invention may be practiced otherwise than as specifically described herein, the invention is to be defined solely with reference to the claims that follow.

The embodiments of the invention in which an exclusive property or privilege is claimed are defined as follows.

1. A method for determining whether a predetermined cut position lies within an unexposed portion of film prior to cutting the film into strips, wherein said method comprises the steps of:

(a) sensing a base density of the film;

(b) sensing a film density at the predetermined cut position of the film;

(c) comparing said base density of the film and said film density at the predetermined cut position; and, (d) producing a cutter control signal, such that said cutter control signal causes a film cutter to cut the film at the predetermined cut position only if said film density at the predetermined cut position is within a predetermined range of said base density of the film.

2. The method of claim 1, wherein said base density sensing step comprises the following steps:

(a) sensing the film substantially continuously and producing film density data whose values are indicative of the density of the film sensed; and, (b) selecting a value of said film density data indicative of the lowest value of said film density and producing said selected film density data value as base density data for the film.

3. The method of claim 2, wherein said step of sensing film density at the predetermined cut position comprises the step of producing cut position density data whose value is indicative of said film density at the predetermined cut position.

4. The method of claim 3, wherein said comparing step includes the steps of:

(a) monitoring film travel and producing a control signal when the film has reached the predetermined cut position; and, (b) comparing said base density data and said cut position density data when said control signal is produced.

5. The method of claim 4, wherein said selecting step includes the steps of:

(a) receiving and storing said film density data in a first data storage device;

(b) producing an output from said first data storage device, wherein said output is a film density data value stored in said first data storage device indicative of the lowest film density sensed;

(c) updating said output from said first data storage device when a film density data value indicative of a lower film density than previously sensed is received by said first data storage device; and, (d) reading and storing said output from said first data storage device in a second data storage device and producing said output from said first data storage device as an output from said second data storage device, wherein said output of said second storage device is said base density data.

6. The method of claim 5, wherein said method further comprises the step of keying said base density data to a particular roll of film in a batch containing several rolls of film.

7. The method of claim 6, wherein said keying step comprises the steps of:

(a) detecting a splice between a trailing edge of a first roll of film and a leading edge of a second roll of film;

(b) resetting said first data storage device when said splice is detected at a first time;

(c) stopping said second data storage device from reading said output from said first data storage device when said splice is detected at said first time; and, (d) restarting said reading of said output from said first data storage device by said second data storage device when said splice is detected at a second time subsequent to said first time.

8. The method of claim 7, wherein said step of sensing the film substantially continuously comprises the steps of:

(a) transmitting a first visible light signal through the film;

(b) receiving said first visible light signal after said first visible light signal has passed through the film, wherein the strength of said received first visible light signal is inversely proportional to the density of the film sensed;

(c) producing a first electric signal whose magnitude is related to said strength of said received first visible light signal; and, (d) converting said first electric signal into said film density data whose value is related to the density of the film sensed.

9. The method of claim 8, wherein said step of sensing film density at the predetermined cut position comprises the steps of:

(a) transmitting a second visible light signal through the film at the predetermined cut position;

(b) receiving said second visible light signal after said second visible light signal has passed through the film, wherein the strength of said received second visible light signal is inversely proportional to said film density at the predetermined cut position;

(c) producing a second electric signal whose magnitude is related to the strength of said received second visible light signal; and, (d) converting said second electric signal into said cut position density data whose value is related to said film density at the predetermined cut position.

10. An apparatus for determining whether a predetermined cut position lies within an unexposed portion of a roll of film prior to cutting the film into strips, said apparatus comprising:

(a) first density-sensing means for sensing base density of the film and producing base density data whose value is a function of said base density;

(b) second density-sensing means for sensing film density at the predetermined cut position and producing cut position density data whose value is a function of said film density at the predetermined cut position; and, (c) a comparator coupled to said first and second density-sensing means for comparing said base density data and said cut position density data and producing a cutter control signal to enable a film cutter to cut the film only when said cut position density data indicates that said film density at the predetermined cut position is within a predetermined range of said base density of the film.

11. The apparatus of claim 10, wherein said first density-sensing means comprises:

(a) a first density sensor for sensing said film density at a plurality of locations and producing said film density data;

(b) a base density selector coupled to said first density sensor for selecting a value of said film density data indicative of the lowest value of said film density and producing said selected film density data value as said base density data.

12. The apparatus of claim 11, wherein said second density-sensing means comprises a second density sensor for sensing said film density at the predetermined cut position and producing said cut position density data.

13. The apparatus of claim 12, wherein said first density sensor is an optical sensor comprising:

(a) a first transmitter for transmitting a first light signal through the film;

(b) a first receiver for receiving said first light signal after said first light signal has passed through the film, wherein the strength of said first light signal after passing through the film is inversely proportional to said film density, said first receiver producing a first electric signal whose magnitude is related to the strength of said first light signal received by said first receiver; and, (c) a first analog-to-digital converter for converting said first electric signal into said film density data.

14. The apparatus of claim 13, wherein said second density sensor is an optical sensor comprising:

(a) a second transmitter for transmitting a second light signal through the film;

(b) a second receiver for receiving said second light signal after said second light signal has passed through the film, wherein the strength of said second light signal after passing through the film is inversely proportional to said film density at the predetermined cut position, said second receiver producing a second electric signal whose magnitude is related to the strength of said second light signal received by said second receiver; and, (c) a second analog-to-digital converter for converting said second electric signal into said cut position density data.

15. The apparatus of claim 14, wherein said first and second light signals consist substantially of visible light energy.

16. The apparatus of claim 12, wherein said base density selector comprises:

(a) a first data storage device coupled to said first density sensor for receiving and storing said film density data and producing an output having a film density data value indicative of the lowest film density sensed by said first density sensor; and, (b) a second data storage device coupled to said first data storage device for reading and storing said output from said first data storage device and producing said output from said first data storage device as an output from said second data storage device, wherein said output from said second storage device is said base density data.

17. The apparatus of claim 16, wherein said first density sensor is an optical sensor comprising:

(a) a first transmitter for transmitting a first light signal through the film;

(b) a first receiver for receiving said first light signal after said first light signal has passed through the film, wherein the strength of said first light signal after passing through the film is inversely proportional to said film density, said first receiver producing a first electric signal whose magnitude is related to the strength of said first light signal received by said first receiver; and, (c) a first analog-to-digital converter for converting said first electric signal into said film density data.

18. The apparatus of claim 17, wherein said second density sensor is an optical sensor comprising:

(a) a second transmitter for transmitting a second light signal through the film;

(b) a second receiver for receiving said second light signal after said second light signal has passed through the film, wherein the strength of said second light signal after passing through the film is inversely proportional to said film density at the predetermined cut position, said second receiver producing a second electric signal whose magnitude is related to the strength of said second light signal received by said second receiver; and, (c) a second analog-to-digital converter for converting said second electric signal into said cut position density data.

19. The apparatus of claim 18, wherein said first and second light signals consist substantially of visible light energy.

20. The apparatus of claim 16, wherein the film comprises at least a first roll of film and a second roll of film connected by a splice and said base density selector further comprises:

(a) a first splice detector for detecting the splice connecting a trailing edge of the first roll of film and a leading edge of the second roll of film, said first splice detector detecting the splice at a first time and producing a reset signal, said reset signal applied to said first data storage device to cause said first data storage device to reset, and producing a stop signal, said stop signal applied to said second storage device to cause said second storage device to stop reading said output of said first data storage device; and, (b) a second splice detector for detecting the splice at a second time subsequent to said first time and producing a start signal, said start signal applied to said second data storage device to cause said second data storage device to resume reading said output of said first data storage device.

21. The apparatus of claim 20, wherein said first density sensor is an optical sensor comprising:

(a) a first transmitter for transmitting a first light signal through the film;

(b) a first receiver for receiving said first light signal after said first light signal has passed through the film, wherein the strength of said first light signal after passing through the film is inversely proportional to said film density, said first receiver producing a first electric signal whose magnitude is related to the strength of said first light signal received by said first receiver; and, (c) a first analog-to-digital converter for converting said first electric signal into said film density data.

22. The apparatus of claim 21, wherein said second density sensor is an optical sensor comprising:

(a) a second transmitter for transmitting a second light signal through the film;

(b) a second receiver for receiving said second light signal after said second light signal has passed through the film, wherein the strength of said second light signal after passing through the film is inversely proportional to said film density at the predetermined cut position, said second receiver producing a second electric signal whose magnitude is related to the strength of said second light signal received by said second receiver; and, (c) a second analog-to-digital converter for converting said second electric signal into said cut position density data.

23. The apparatus of claim 22, wherein said first and second light signals consist substantially of visible light energy.

24. The apparatus of claim 22, wherein the first and second splice detectors are comparators, such that said first splice detector compares the magnitude of a first splice detection signal to a predetermined threshold value and produces said reset and stop signals when the magnitude of said first splice detection signal is less than said predetermined threshold value and said second splice detector compares the magnitude of a second splice detection signal to said predetermined threshold level and produces said start signal when the magnitude of said second splice detection signal is less than said predetermined threshold level.

25. The apparatus of claim 12, wherein said apparatus further comprises a counter for counting pulses produced by a film drive indicative of the travel of said film, said counter producing a control signal when a predetermined number of pulses has been counted indicating the arrival of the film at the predetermined cut position, said control signal causing said comparator to compare said base density data and said cut position density data.

* * * * *